United States Patent
Horng

(10) Patent No.: US 9,309,708 B1
(45) Date of Patent: Apr. 12, 2016

(54) HINGE WITH A MALE HINGE SHAFT AXIALLY MOVABLE BY A LEVER

(71) Applicant: Chin-Hsing Horng, Taoyuan (TW)

(72) Inventor: Chin-Hsing Horng, Taoyuan (TW)

( * ) Notice: Subject to any disclaimer, the term of this patent is extended or adjusted under 35 U.S.C. 154(b) by 0 days.

(21) Appl. No.: 14/509,035

(22) Filed: Oct. 7, 2014

(51) Int. Cl.
*E05D 11/10* (2006.01)
*E05D 3/02* (2006.01)

(52) U.S. Cl.
CPC .............. *E05D 11/1007* (2013.01); *E05D 3/02* (2013.01); *Y10T 16/5407* (2015.01); *Y10T 16/54038* (2015.01)

(58) Field of Classification Search
CPC ...................... Y10T 16/54038; Y10T 16/5407; Y10T 16/54024; Y10T 16/557; Y10T 16/528; E05Y 2900/606; G06F 1/1616; G06F 1/1681; H04M 1/0216; H04M 1/0214; E05D 3/02; E05D 11/08; E05D 11/087; E05D 11/10; E05D 11/1014; E05D 11/1007
USPC ............................ 16/342, 349, 324, 386, 231; 379/433.13; 455/575.3; 361/679.27
See application file for complete search history.

(56) References Cited

U.S. PATENT DOCUMENTS

| | | | | |
|---|---|---|---|---|
| 5,229,921 A * | 7/1993 | Bohmer | ................ | G06F 1/1679 16/324 |
| 5,832,566 A * | 11/1998 | Quek | .................... | G06F 1/1681 16/342 |
| 6,871,384 B2 * | 3/2005 | Novin | ................. | B60R 11/0235 16/337 |
| 8,205,302 B2 * | 6/2012 | Wang | .................. | H04M 1/0216 16/342 |
| 9,021,658 B1 * | 5/2015 | Yang | ......................... | G06F 1/16 16/366 |
| 2014/0304948 A1 * | 10/2014 | Onda | .................... | E05D 11/082 16/342 |
| 2015/0040353 A1 * | 2/2015 | Chen | ..................... | G06F 1/1681 16/366 |

* cited by examiner

*Primary Examiner* — William Miller

(57) ABSTRACT

A hinge having the characteristics of space-saving and ease of installation is disclosed to include a mounting base member affixed to a base member of a flip-up electronic product, female hinge shafts fixedly mounted in the mounting base member, a male hinge shaft rotatably inserted through the female hinge shafts and connectable to a cover member of the flip-up electronic product, and a lever pivotally mounted at the mounting base member and operable to move the male hinge shaft axially relative to the female hinge shafts between a mounting position where the male hinge shaft is fastened to the cover member of the flip-up electronic product and a dismounting position where the male hinge shaft is disconnected from the cover member.

10 Claims, 11 Drawing Sheets

US 9,309,708 B1

HINGE WITH A MALE HINGE SHAFT AXIALLY MOVABLE BY A LEVER

BACKGROUND OF THE INVENTION

1. Field of the Invention

The present invention relates to hinge technology and more particularly, to hinge, which is practical for use in a flip-up electronic product and, which allows the male hinge shaft thereof to be moved axially between a mounting position and a dismounting position.

2. Description of the Related Art

Hinges are intensively used in flip-up mobile electronic devices, such as notebook, electronic dictionary, PDA and etc. to pivotally connect a base member and a cover member together, allowing only a limited angle of rotation between them.

Further, a conventional flip-up electronic product generally comprises a base member, a cover member, and a hinge pivotally connecting the cover member to the base member. The hinge generally comprises a female hinge shaft having a mounting leaf for fixation to the cover member of the flip-up electronic product, and a male hinge shaft rotatably inserted through the female hinge shaft and having a mounting leaf for fixation to the base member of the flip-up electronic product for allowing the cover member of the flip-up electronic product to be turned relative to the base member between an open position and a close position. However, this conventional design of hinge still has drawbacks as follows:

1. The cover member and base member of the flip-up electronic product must provide a respective mounting leaf for mounting. It is complicated to respectively fasten the mounting leaf of the male hinge shaft and the mounting leaf of the female hinge shaft to the cover member and base member of the flip-up electronic product with screws.

2. Today's electronic products are facing light, thin, short and small design. The mounting leaf of the male hinge shaft and the mounting leaf of the female hinge shaft occupy much space in the cover member and base member of the flip-up electronic product, minimizing available internal space of the flip-up electronic product, not facilitating small size design.

SUMMARY OF THE INVENTION

The present invention has been accomplished under the circumstances in view. It is therefore the main object of the present invention to provide a hinge, which is practical for use in flip-up electronic product, simplifying the installation of the flip-up electronic product and enabling the flip-up electronic product to have light, thin, short and small design characteristics.

To achieve this and other objects of the present invention, a hinge in accordance with the present invention comprises a mounting base member, a lever, at least one female hinge shaft, and a male hinge shaft. The mounting base member comprises a horizontal base wall and two upright walls vertically upwardly extended from a top surface of the horizontal base wall in a parallel relationship. The at least one female hinge shaft is fixedly mounted at the top surface of the horizontal base wall. The male hinge shaft comprises a shaft body rotatably and axially movably inserted through each female hinge shaft, a position-limit groove extending around the periphery of the shaft body and exposed outside the at least one female hinge shaft. The lever comprises a lever body, and a pivot pin pivotally connecting the lever body to the upright walls of the mounting base member. The lever body comprises an operating portion located at one side relative to the pivot pin, and two actuation portions located at an opposite side relative to the pivot pin and bilaterally engaged into the position-limit groove of the male hinge shaft and adapted for moving the male hinge shaft axially relative to the at least one female hinge shaft.

DETAILED DESCRIPTION OF THE PREFERRED EMBODIMENT

Figure 1:
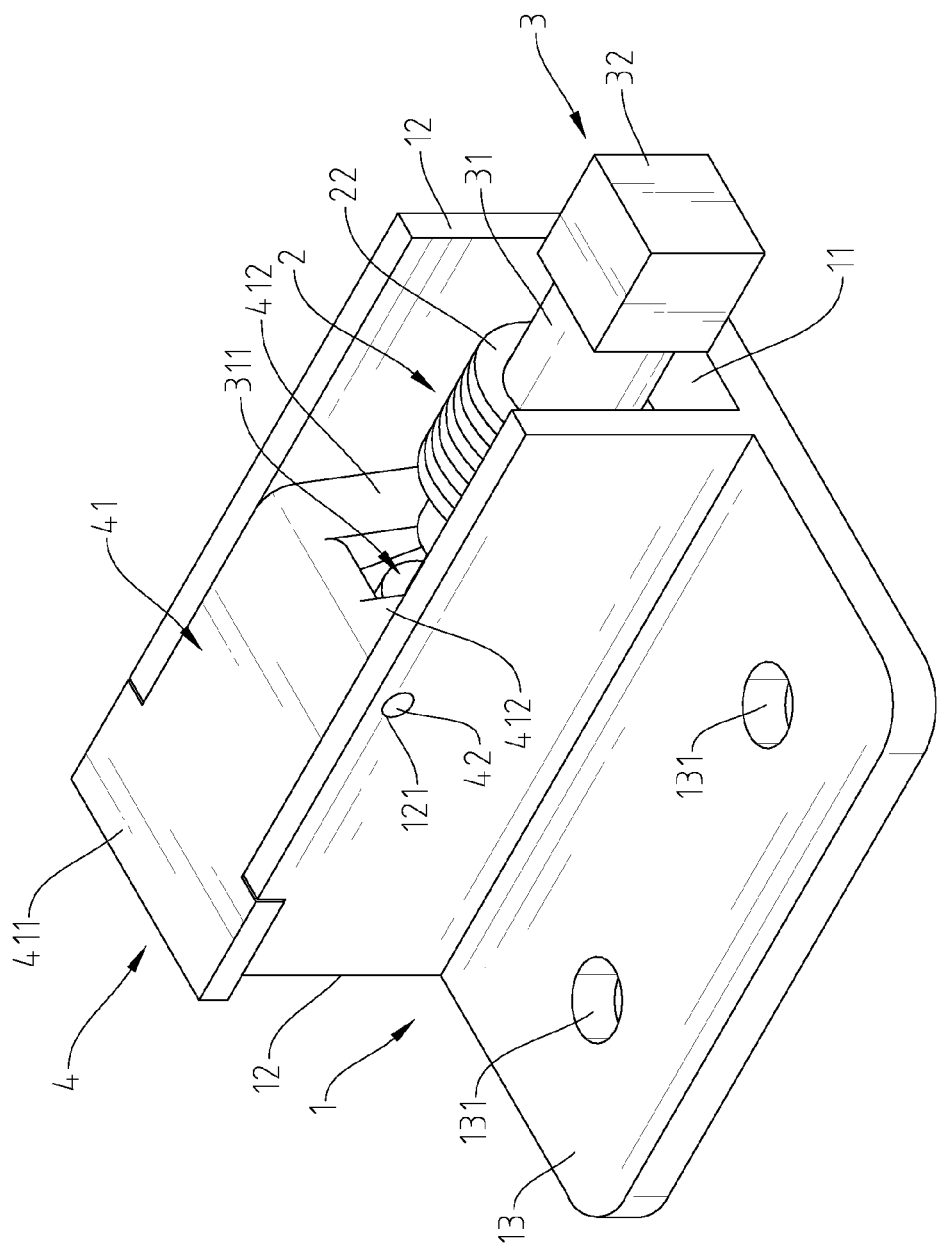
FIG. 1 is an oblique top elevational view of a hinge in accordance with a first embodiment of the present invention.
Figure 2:
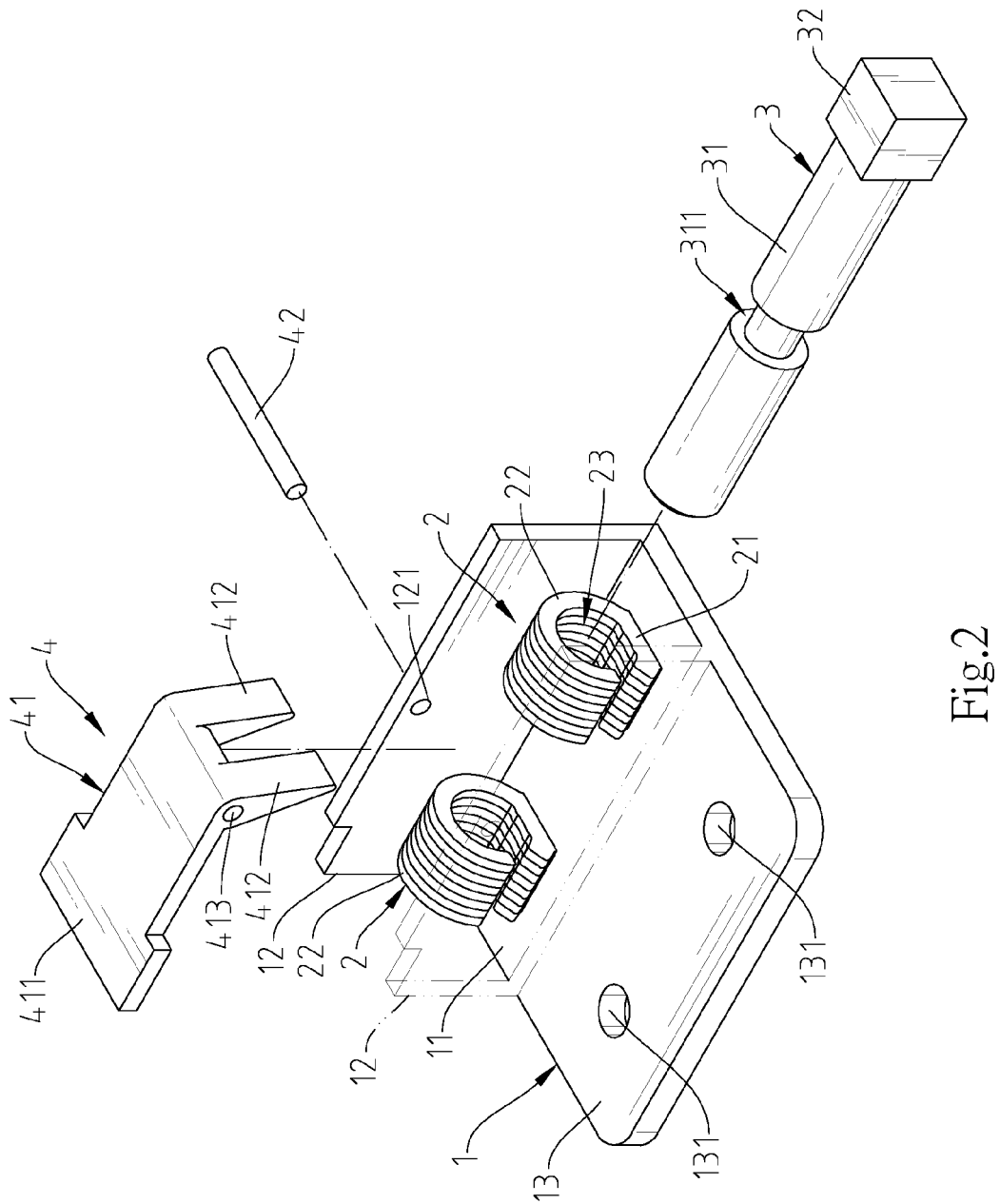
FIG. 2 is an exploded view of the hinge in accordance with the first embodiment of the present invention.
Figure 3:
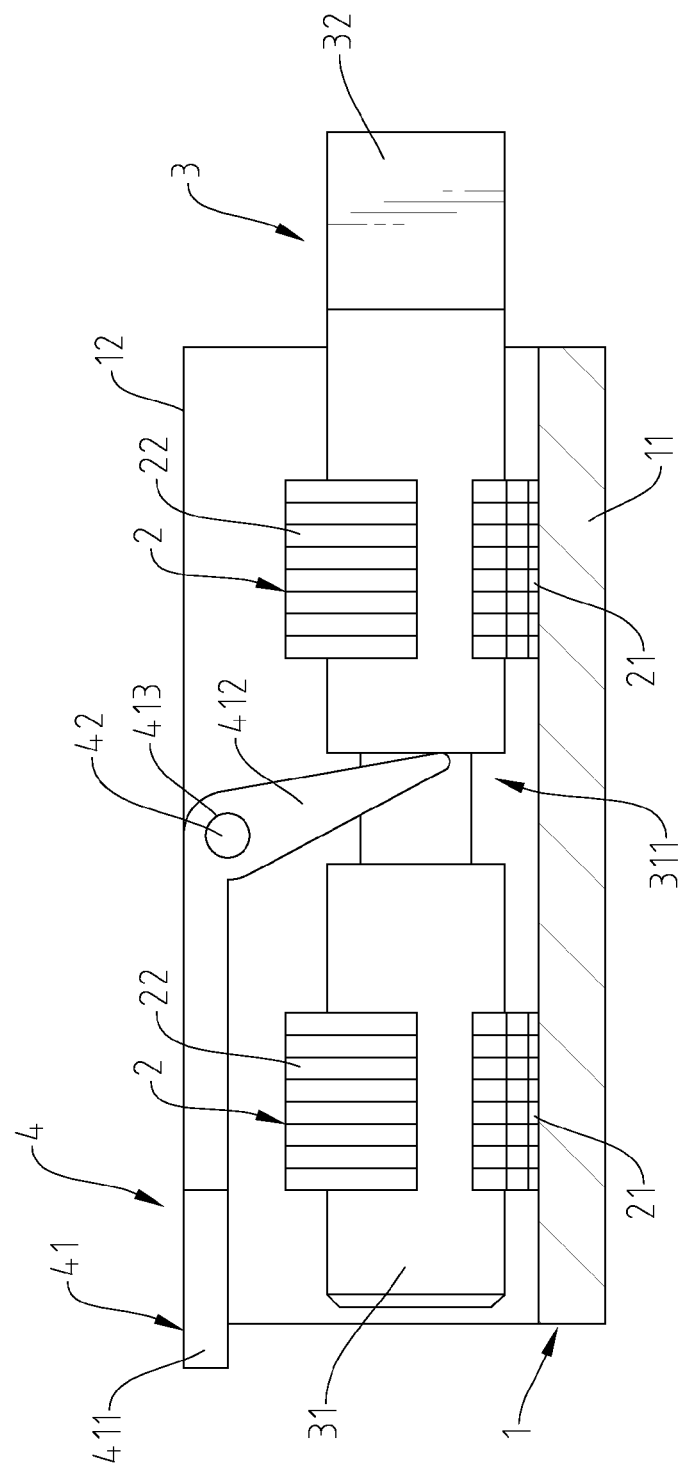
FIG. 3 is a sectional side view of the hinge in accordance with the first embodiment of the present invention.

Referring to FIGS. 1-3, a hinge in accordance with a first embodiment of the present invention comprises a mounting base member 1, two female hinge shafts 2, a male hinge shaft 3, and a lever 4.

The mounting base member 1 comprises a horizontal base wall 11, two upright walls 12 vertically upwardly extended from a top surface of the base wall 11 in a parallel relationship, a pinhole 121 located in each upright wall 12, a mounting wall 13 horizontally extended from one lateral side of the horizontal base wall 11 in a flush manner, and a plurality of mounting through hole 131 cut through opposing top and bottom surfaces of the mounting wall 13.

The female hinge shafts 2 are fixedly mounted at the top surface of the horizontal bottom wall 11 of the mounting base member 1 between the two upright walls 12, each comprising a split tube-like shaft body 22 defining therein an axially extending shaft chamber 23, and a positioning portion 21 formed integral with the periphery of the split tube-like shaft body 22 and fixedly mounted at the top surface of the horizontal bottom wall 11 of the mounting base member 1.

The male hinge shaft 3 comprises a shaft body 31 rotatably and axially movably inserted through the axially extending shaft chamber 23 of each female hinge shaft 2, a non-circular plug portion 32 located at one end of the shaft body 31 and disposed outside the mounting base member 1, and a position-limit groove 311 extending around the periphery of the shaft body 31 on the middle and disposed between the two female hinge shafts 2.

The lever 4 comprises a lever body 41 and a pivot pin 42. The lever body 41 comprises an operating portion 411, two actuation portions 412 bilaterally extended from one end of the operating portion 411, and a pivot hole 413 transversely cut through two opposite lateral sides thereof between the operating portion 411 and the actuation portion 412. The pivot pin 42 is inserted through the pivot hole 413 and respectively fixedly connected with two opposite ends thereof to the pinholes 121 of the mounting base member 1, enabling the actuation portions 412 to be positioned in the position-limit groove 311 and disposed at two opposite lateral sides of the male hinge shaft 3.

Figure 4:
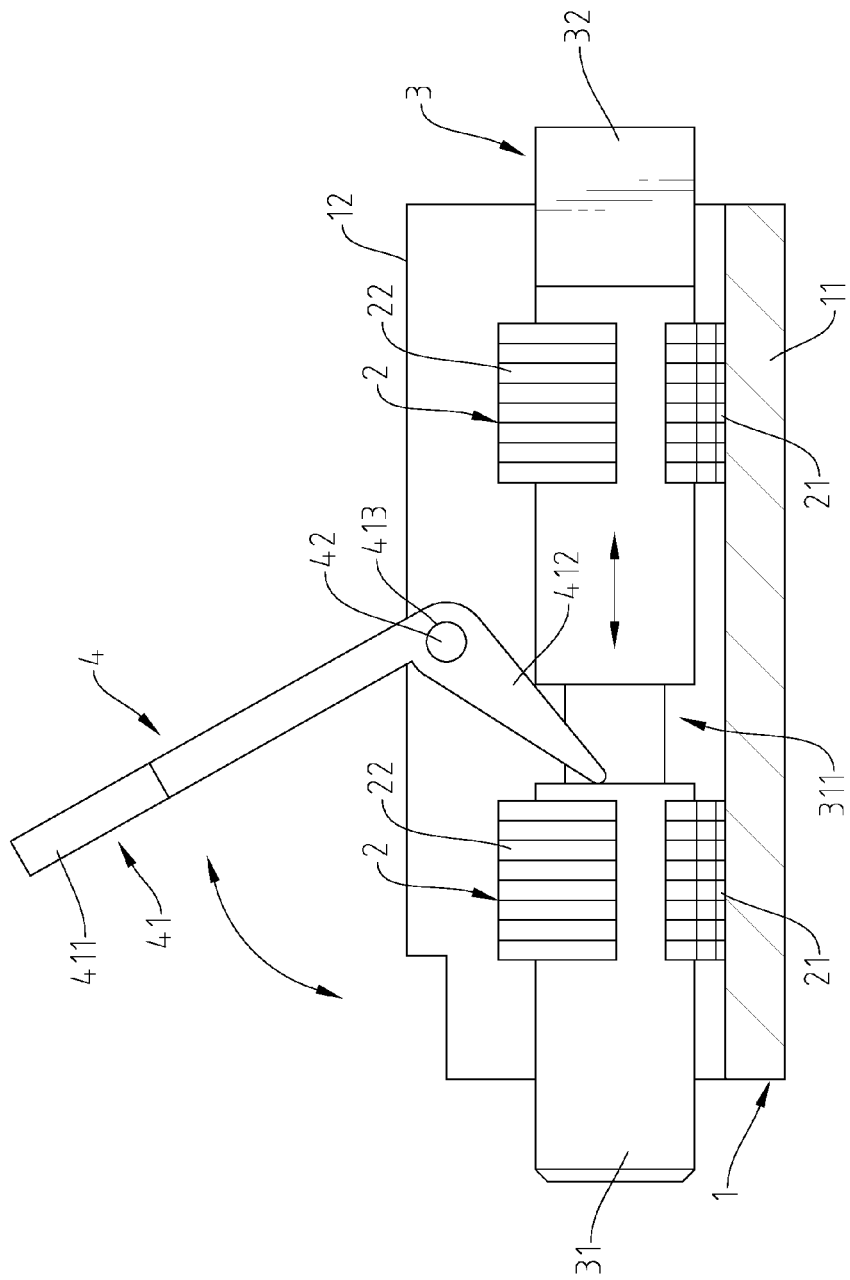
FIG. 4 is an operational view of the hinge in accordance with the first embodiment of the present invention, illustrating the lever biased, the male hinge shaft moved axially relative to the female hinge shafts and the mounting base member.

Referring to FIG. 4 and FIGS. 2 and 3 again, when operating the operating portion 411 of the lever body 41 of the lever 4 to turn the lever body 41 about the pivot pin 42, the actuation portions 412 of the lever 4 will be forced to move the male hinge shaft 3 axially in direction away from or toward the mounting base member 1.

Figure 5:
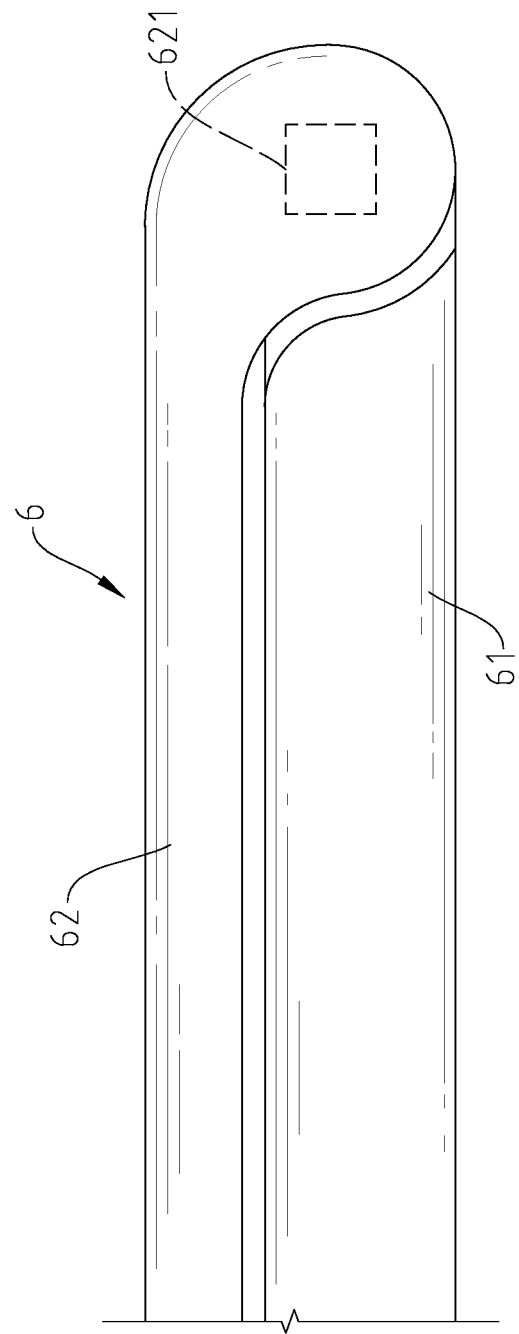
FIG. 5 is a schematic installed view illustrating the hinge of the first embodiment of the present invention used in a flip-up electronic product.
Figure 6:
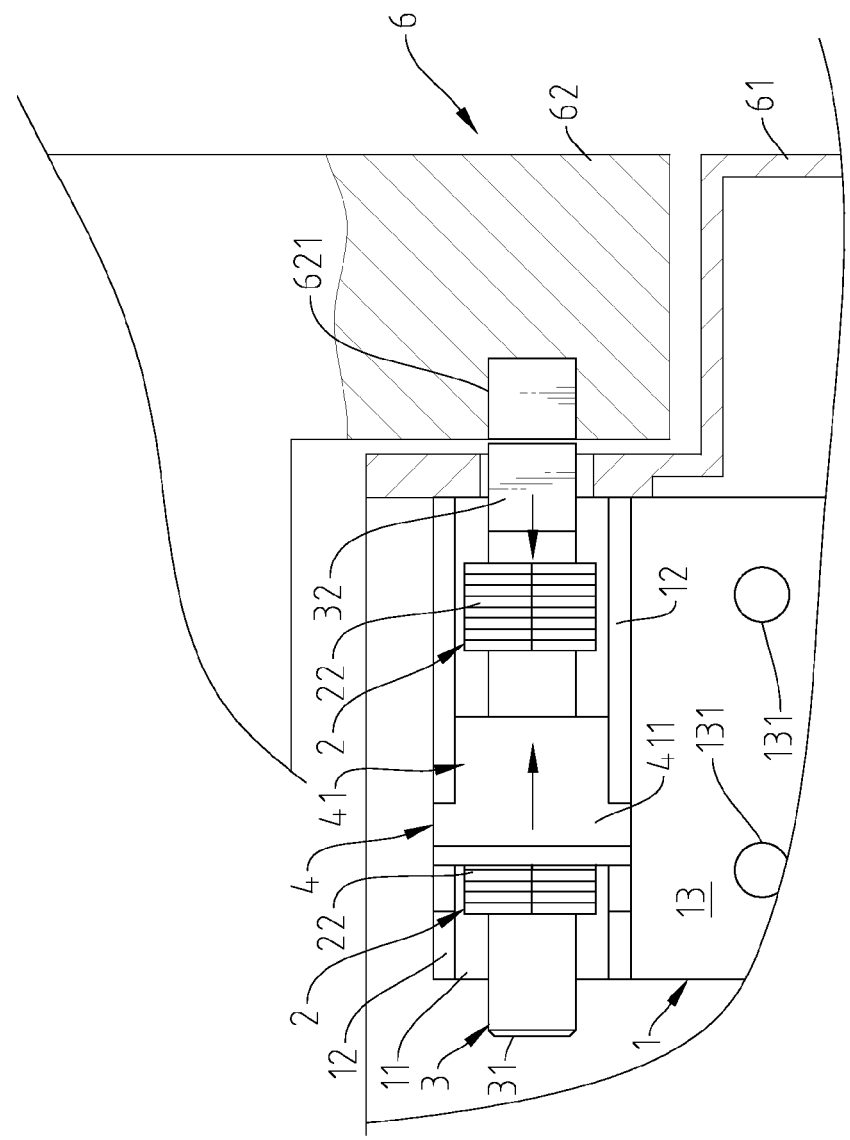
FIG. 6 is a schematic applied view of the first embodiment of the present invention, illustrating an operation status of the hinge in the flip-up electronic device (I).
Figure 7:
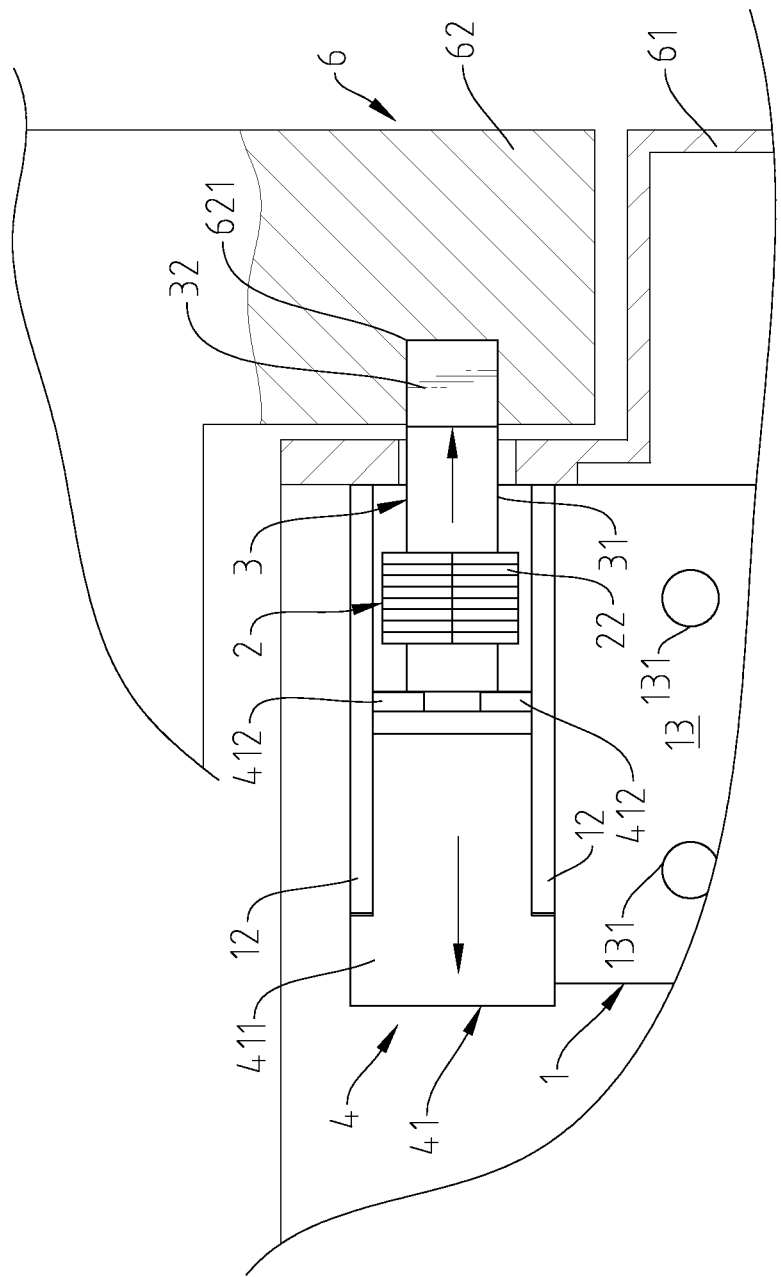
FIG. 7 is a schematic applied view of the first embodiment of the present invention, illustrating an operation status of the hinge structure in the flip-up electronic device (II).

Referring to FIGS. 5-7 and FIGS. 2-4 again, when mounting the hinge in a flip-up electronic product 6, affix the mounting through hole 131 of the mounting wall 13 of the mounting base member 1 to a base member 61 of the flip-up electronic product 6, and then bias the operating portion 411 of the lever 4 in an upward direction away from the upright walls 12 of the mounting base member 1 to drive the actuation portions 412 in moving the male hinge shaft 3 toward the mounting base member 1, and then and then attach the cover member 62 of the flip-up electronic product 6 to the base member 61 to keep a non-circular plug hole 621 of the cover member 62 in axial alignment with the non-circular plug portion 32 of the male hinge shaft 3. At this time, the user can bias the operating portion 411 of the lever 4 in direction toward the upright walls 12 of the mounting base member 1 to push the actuation portion 412 against the male hinge shaft 3 in direction away from the mounting base member 3, forcing the non-circular plug portion 32 of the male hinge shaft 3 into the non-circular plug hole 621 of the cover member 62. Because the non-circular plug portion 32 of the male hinge shaft 3 and the non-circular plug hole 621 of the cover member 62 are non-circular and mates with each other, the cover member 62 is pivotally coupled to the base member 61 by the male hinge shaft 3 after the non-circular plug portion 32 is engaged into the non-circular plug hole 621 of the cover member 62. Similarly, when the user wishes to dismount the cover member 62 and the base member 61, bias the operating portion 411 of the lever 4 in direction away from the upright walls 12 of the mounting base member 1 to force the actuation portions 412 in moving the male hinge shaft 3 toward the mounting base member 1 and to further disengage the non-circular plug portion 32 of the male hinge shaft 3 from the non-circular plug hole 621 of the cover member 62, allowing separation between the base member 61 and the cover member 62.

Figure 8:
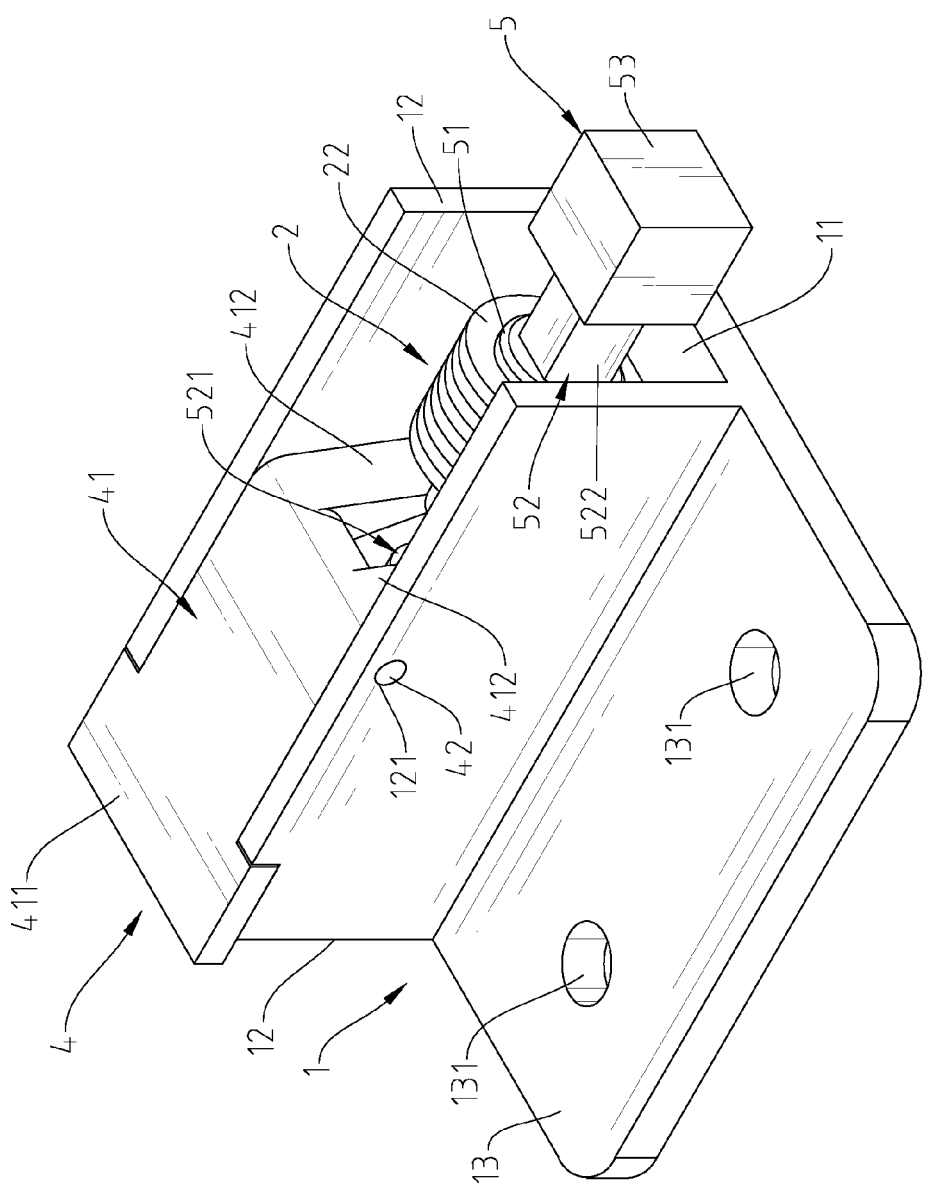
FIG. 8 is an oblique top elevational view of a hinge in accordance with a second embodiment of the present invention.
Figure 9:
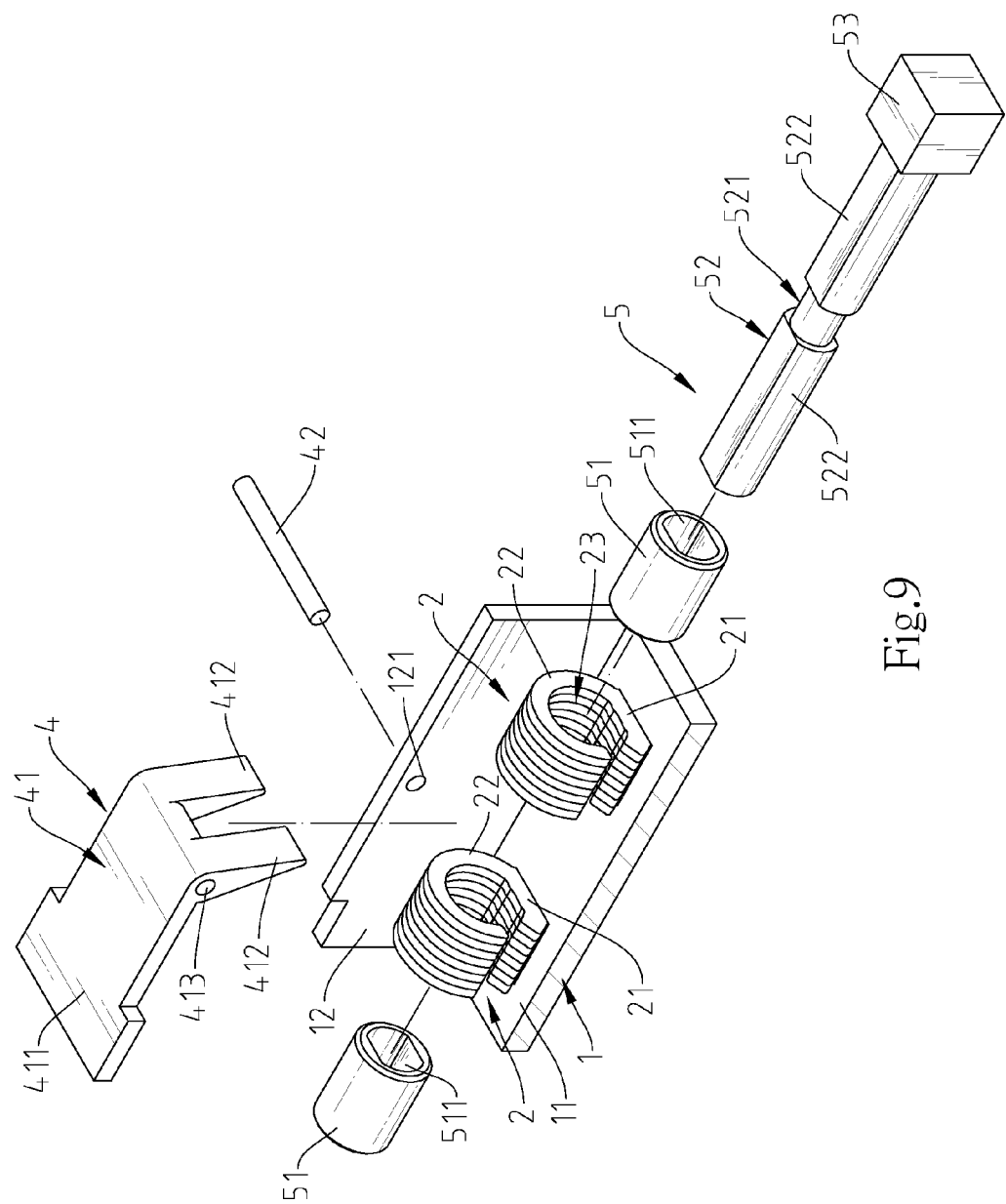
FIG. 9 is an exploded view of the hinge in accordance with the second embodiment of the present invention.
Figure 10:
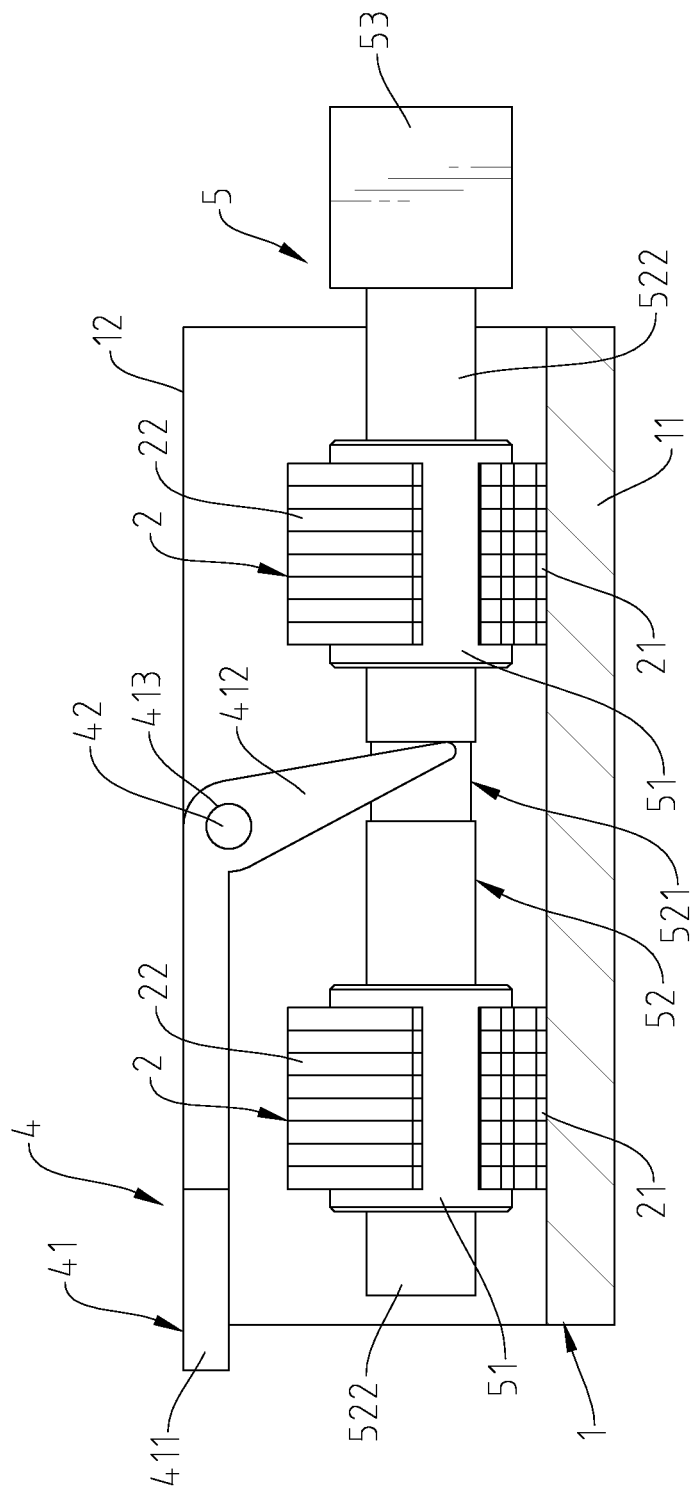
FIG. 10 is a sectional view of the hinge in accordance with the second embodiment of the present invention.

Referring to FIGS. 8-10, a hinge in accordance with a second embodiment of the present invention is shown. This second embodiment is substantially similar to the aforesaid first embodiment with exception of the design of the male hinge shaft. According to this second embodiment, the male hinge shaft, referenced by 5, comprises at least one, for example, two cylindrical shaft bodies 51 respectively rotatably inserted through the shaft chambers 23 of the female hinge shafts 2, each cylindrical shaft body 51 having a non-circular coupling hole 511 axially extending through two opposing ends thereof, and a transmission rod 52 axially slidably inserted through the non-circular coupling hole 511 of each cylindrical shaft body 51. The transmission rod 52 comprises a non-circular rod body 522 inserted through the non-circular coupling hole 511 of each cylindrical shaft body 51 for allowing each cylindrical shaft body 51 to be rotated with the transmission rod 52, a position-limit groove 521 extending around the periphery of the non-circular rod body 522 and coupled to the actuation portions 412 of the lever 4, and a non-circular plug portion 53 located at one end of the non-circular rod body 522.

Figure 11:
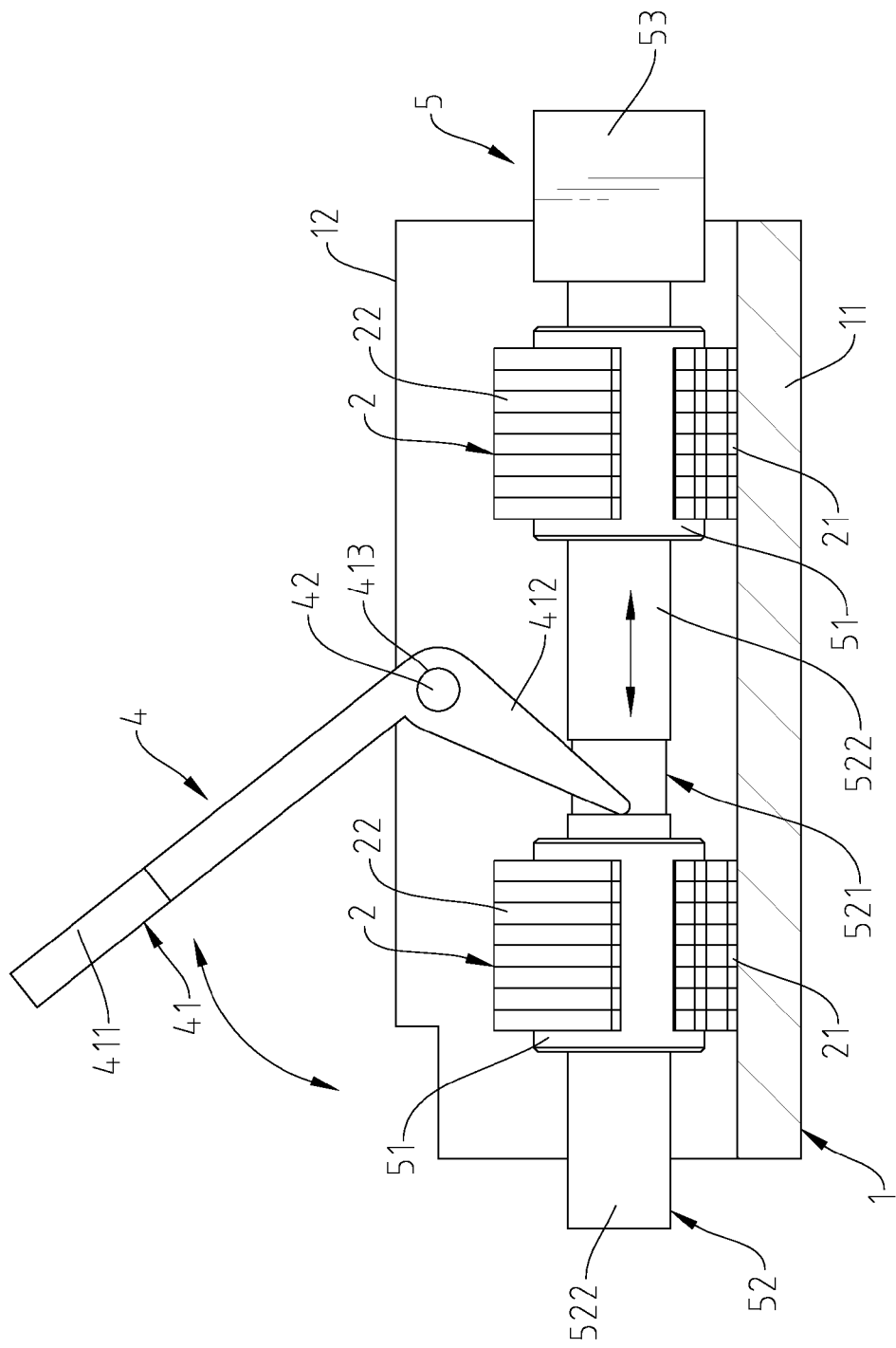
FIG. 11 is an operational view of the second embodiment of the present invention, illustrating the lever biased, the male hinge shaft moved axially relative to the female hinge shafts and the mounting base member.

Referring to FIG. 11 and FIGS. 8-10 again, in application, as illustrated, the user can operate the operating portion 411 of the lever 4 to turn the lever 4 about the pivot pin 42, forcing the actuation portions 412 of the lever 4 to move the transmission rod 52 of the male hinge shaft 5 relative to the cylindrical shaft bodies 51 and the female hinge shafts 2 in direction toward or away from the mounting base member 1.

What is claimed is:

1. A hinge, comprising:
   a mounting base member comprising a horizontal base wall and two upright walls vertically upwardly extended from a top surface of said horizontal base wall in a parallel relationship, a lever pivotally coupled between said two upright walls, at least one female hinge shaft fixedly mounted at the top surface of said horizontal base wall, and a male hinge shaft rotatably inserted through each said female hinge shaft, wherein:
   said male hinge shaft comprises a shaft body rotatably and axially movably inserted through each said female hinge shaft, a position-limit groove extending around the periphery of said shaft body and exposed outside said at least one female hinge shaft; said lever comprises a lever body and a pivot pin pivotally connecting said lever body to said upright walls, said lever body comprising an operating portion located at one side relative to said pivot pin and at least one actuation portion located at an opposite side relative to said pivot pin and engaged into said position-limit groove of said male hinge shaft and adapted for moving said male hinge shaft axially relative to said at least one female hinge shaft.

2. The hinge as claimed in claim 1, wherein each said female hinge shaft comprises a split tube-shaped shaft body, an axially extending shaft chamber defined in said split tube-shaped shaft body for the passing of said male hinge shaft, and a positioning portion formed integral with said split tube-shaped shaft body and affixed to the top surface of said horizontal base wall.

3. The hinge as claimed in claim 1, wherein each said upright wall of said mounting base member comprises a pinhole; said lever body comprises a pivot hole transversely extending through two opposite lateral sides thereof between said operating portion and said actuation portions and pivotally coupled to the pinholes of said upright walls of said mounting base member by said pivot pin.

4. The hinge as claimed in claim 1, wherein said lever comprises two said actuation portions respectively engaged into said position-limit groove and disposed at two opposite lateral sides of said male hinge shaft.

5. The hinge as claimed in claim 1, wherein said male hinge shaft further comprises a non-circular plug portion located at one end of said shaft body and disposed outside said at least one female hinge shaft and said mounting base member.

6. A hinge, comprising:
   a mounting base member comprising a horizontal base wall and two upright walls vertically upwardly extended from a top surface of said horizontal base wall in a parallel relationship, a lever pivotally coupled between said two upright walls, at least one female hinge shaft fixedly mounted at the top surface of said horizontal base wall, and a male hinge shaft rotatably inserted through each said female hinge shaft, wherein:

said male hinge shaft comprises at least one cylindrical shaft body rotatably inserted through said at least one female hinge shaft, each said cylindrical shaft body having a non-circular coupling hole axially extending through two opposing ends thereof, and a transmission rod axially slidably inserted through the non-circular coupling hole of each said cylindrical shaft body, said transmission rod comprising a non-circular rod body inserted through the non-circular coupling hole of each said cylindrical shaft body for allowing each said cylindrical shaft body to be rotated with said transmission rod and a position-limit groove extending around the periphery of said non-circular rod body;

said lever comprises a lever body and a pivot pin pivotally connecting said lever body to said upright walls of said mounting base member, said lever body comprising an operating portion located at one side relative to said pivot pin and at least one actuation portion located at an opposite side relative to said pivot pin and engaged into said position-limit groove of said transmission rod of said male hinge shaft and adapted for moving said male hinge shaft axially relative to said at least one female hinge shaft.

7. The hinge as claimed in claim 6, wherein each said female hinge shaft comprises a split tube-shaped shaft body, an axially extending shaft chamber defined in said split tube-shaped shaft body for the passing of said male hinge shaft, and a positioning portion formed integral with said split tube-shaped shaft body and affixed to the top surface of said horizontal base wall.

8. The hinge as claimed in claim 6, wherein each said upright wall of said mounting base member comprises a pinhole; said lever body comprises a pivot hole transversely extending through two opposite lateral sides thereof between said operating portion and said actuation portions and pivotally coupled to the pinholes of said upright walls of said mounting base member by said pivot pin.

9. The hinge as claimed in claim 6, wherein said lever comprises two said actuation portions respectively engaged into said position-limit groove and disposed at two opposite lateral sides of said male hinge shaft.

10. The hinge as claimed in claim 6, wherein said male hinge shaft further comprises a non-circular plug portion located at one end of said transmission rod and disposed outside said at least one female hinge shaft and said mounting base member.

\* \* \* \* \*